United States Patent

Ballantyne

[15] 3,696,415
[45] Oct. 3, 1972

[54] ADAPTIVE PULSE QUANTIZER SYSTEM

[72] Inventor: Jack R. Ballantyne, Santa Ana, Calif.

[73] Assignee: Hughes Aircraft Company, Culver City, Calif.

[22] Filed: May 21, 1970

[21] Appl. No.: 39,189

[52] U.S. Cl.............................343/6.5 LC, 343/5 DP
[51] Int. Cl.............................G01s 9/56, G01s 7/28
[58] Field of Search..............343/6.5, 6.5 LC, 5 DP

[56] References Cited

UNITED STATES PATENTS

| | | |
|---|---|---|
| 3,466,614 | 9/1969 | Mikailoff et al. ..343/6.5 LC X |
| 3,440,652 | 4/1969 | Bates et al............343/6.5 R X |
| 3,336,591 | 8/1967 | Michnik et al........343/6.5 LC |

*Primary Examiner*—Malcolm F. Hublen
*Attorney*—W. H. MacAlister, Jr. and Walter J. Adam

[57] ABSTRACT

A pulse quantizer system particularly suitable for use in secondary surveillance radar applications for discriminating between reply pulses which occur in near time coincidence. In such applications, an interrogation signal is periodically transmitted at a selected sweep rate from a fixed antenna station and detected by transponders carried by aircraft, for example, within the antenna range. The transponders in turn transmit a coded reply back to the antenna station. The coded replies are normally comprised of 13 data bits serially provided between first and second framing bits spaced by a precise interval, usually 20.3 microseconds. Each data bit is represented by the occurrence or non-occurrence of a pulse within a corresponding bit time slot of the 20.3 microsecond interval. The disclosed pulse quantizer system facilitates discrimination between replies from two or more transponders where the pulses thereof occur in near time coincidence. After each interrogation, the system measures the time duration of the first reply pulse (presumed to be the first framing bit) and for the remainder of that sweep interval, accepts or rejects pulses based on whether or not they fall within corresponding portions of subsequent bit time slots within that sweep interval.

6 Claims, 4 Drawing Figures

PATENTED OCT 3 1972 3,696,415

INVENTOR.
JACK R. BALLANTYNE,
BY
Walter J. Adam

ATTORNEY

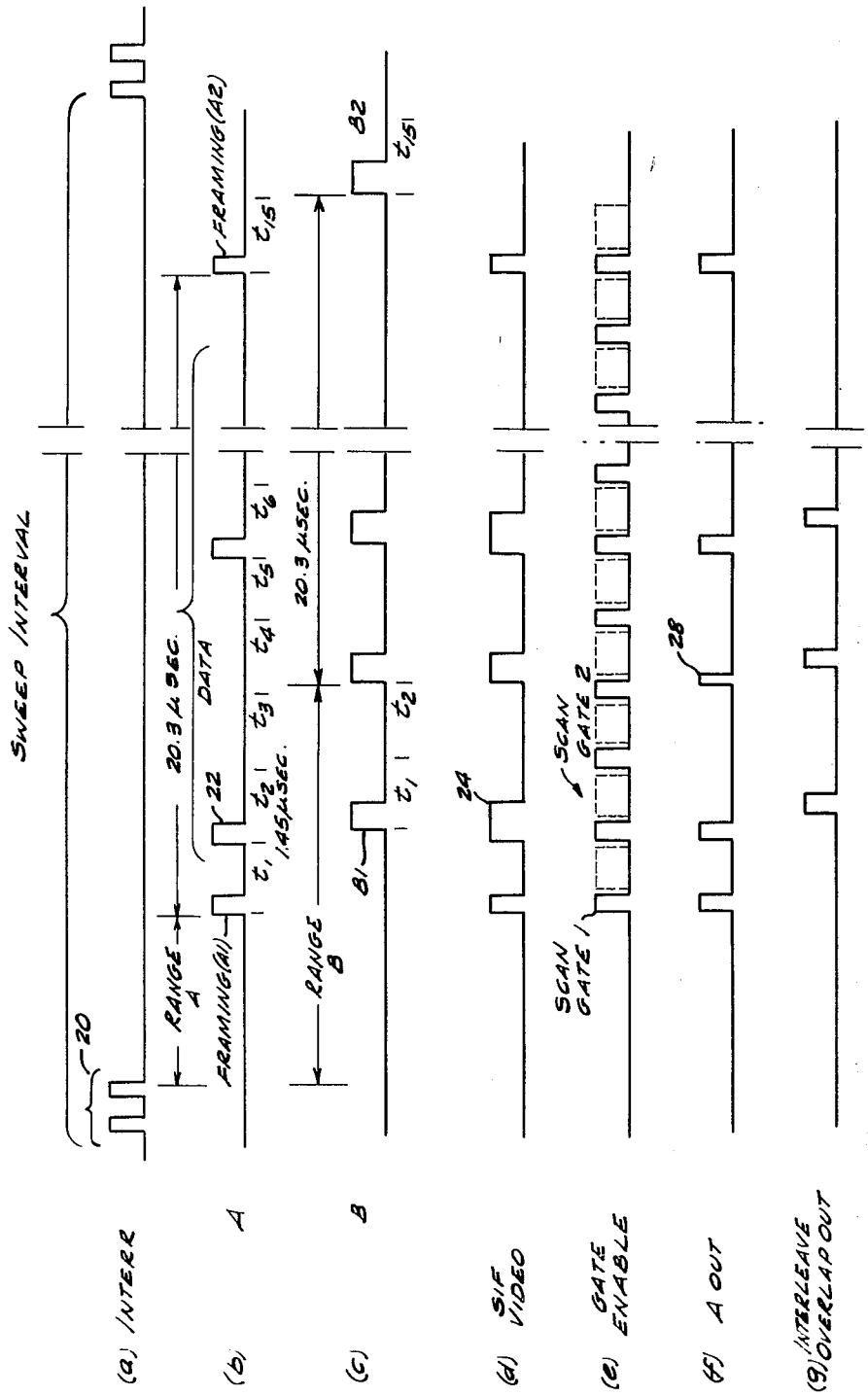

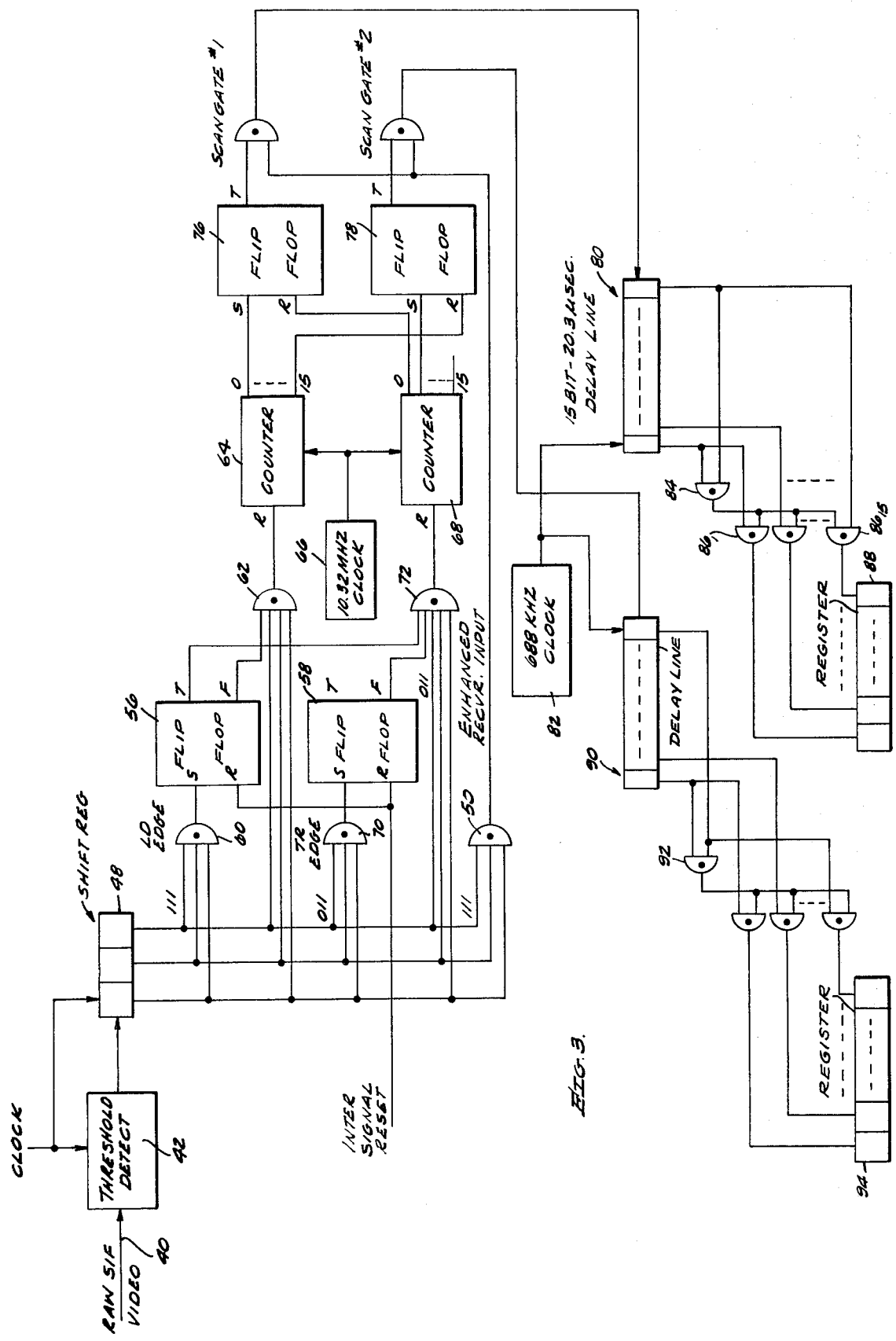

ADAPTIVE PULSE QUANTIZER SYSTEM

BACKGROUND OF THE INVENTION

This invention relates generally to secondary surveillance radar systems and, more particularly, to a pulse quantizer subsystem for use therein for facilitating discrimination between reply pulses occurring in near time coincidence.

Secondary surveillance radar systems are useful in many applications, perhaps the most significant being for the control of civilian air traffic as part of the Common Air Traffic Control System of the Federal Aviation Agency. In this system, an interrogating transmitter at a fixed ground station periodically transmits a signal which is detected by transponders carried by local targets, i.e., aircraft within the range of the ground station and the transponders in turn transmit a coded reply which is then used as an ordinary radar echo to determine range. The reply, however, will additionally contain data expressing identification or altitude data, for example. The reply format is normally comprised of first and second framing pulses spaced by a precisely timed interval of, for example, 20.3 microseconds. Thirteen data bits are respectively represented by the occurrence or non-occurrence of pulses occurring within thirteen bit time slots successively defined during the 20.3 microsecond interval between the leading edges of the first and second framing pulses.

In the case where two or more aircraft respond to the same interrogation, it of course becomes difficult to discriminate one reply from another. In order to facilitate such discrimination, some prior art systems accept or reject pulses dependent upon whether or not they occur in a specified portion, corresponding to a fixed pulse width, of each bit time slot. This technique, referred to as fixed pulse width discrimination, is prone to unwanted rejection as a consequence of variations in the width of pulses provided by the transponder. Such variations tend to occur as the transponder equipment ages and drifts.

SUMMARY OF THE INVENTION

The present invention is directed to an improved pulse quantizer system for discriminating between reply pulses which occur in near time coincidence.

In accordance with the present invention, an adaptive variable width pulse quantizer system is provided which accepts or rejects pulses during a sweep interval based on the measured width of the first pulse received during that interval.

More particularly, in the preferred embodiment of the present invention, the width of the initial pulse received during a sweep interval is measured by resetting first and second free running counters in response to the leading and trailing edges of the initial pulse, respectively. During the remainder of the sweep interval, following the initial pulse, fourteen bit time slots are defined. A first scan gate is enabled during a corresponding portion of each bit time slot for a duration determined by the measured width of the initial pulse. Pulses received during that duration are interpreted as constituting part of the reply associated with the initial pulse. Portions of pulses received outside of that duration are interpreted as overlapping or interleaved bits attributable to another transmitter which, in some cases, can be usefully employed to yield data regarding a second aircraft.

The novel features of the invention are set forth with particularity in the appended claims. The invention will be best understood from the following description when read in conjunction with the accompanying drawings.

BRIEF DESCRIPTION OF THE DRAWINGS

FIG. 2 is a waveform diagram illustrating the manner of discriminating between reply pulses occurring in near time coincidence in accordance with the present invention;

FIG. 3 is a block diagram of a preferred embodiment of the present invention.

DESCRIPTION OF THE PREFERRED EMBODIMENT

Figure 1:
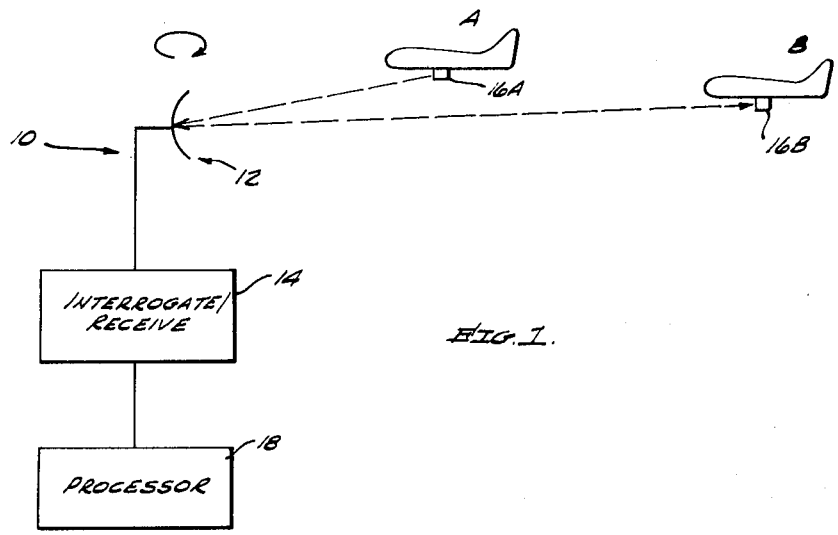
FIG. 1 is a schematic block diagram of a secondary surveillance radar system which can advantageously employ the teachings of the present invention.

Attention is now called to FIG. 1 of the drawing which illustrates a block schematic diagram of a secondary surveillance radar system which can advantageously utilize the teachings of the present invention. The exemplary system illustrated in FIG. 1 is useful for the surveillance of targets, i.e., aircraft in the vicinity of a ground station 10. A scanning antenna 12 is mounted at the ground station 10. An interrogate/receive means 14 is connected to the antenna 12 in order to cause the antenna to periodically transmit interrogate signals and to accept reply signals received from the antenna.

More particularly, as will be described in greater detail hereinafter, the interrogate/receive means 14 periodically transmits an interrogate signal via the antenna 12. The period between successive interrogate signal transmissions will be referred to as a sweep interval. The interrogate signals will be recognized by a transponder unit 16A carried by aircraft A shown in FIG. 1 and the transponder in turn will transmit a reply message to the antenna 12. The reply message can be used as an ordinary radar echo to determine the range of the aircraft A from the antenna 12. In addition however, the reply message normally includes a plurality of data bits which, for example, identify the aircraft. The reply message received by the antenna 12 (sometimes hereinafter referred to as selective identification feature [SIF] video) is coupled to a processor 18 which can then process the data with respect to the aircraft within the vicinity of the ground station 10.

When a second aircraft B is also in the vicinity of the ground station, the reply message transmitted by transponder 16B may overlap with the reply message transmitted by the transponder 16A, thereby making it difficult for the processor 18 to discriminate between the two reply messages. The present invention is primarily directed to an adaptive pulse quantizer system for facilitating discrimination between pulses of different reply messages occurring in near time coincidence.

Attention is now called to FIG. 2 which illustrates exemplary waveforms which typically occur in the system of FIG. 1. Line (a) of FIG. 2 illustrates a typical interrogation signal 20 which is comprised of two pulses spaced in time by a precise interval. As the antenna 12 scans, it transmits the interrogation signal 20 once during each sweep interval. Many sweep intervals are defined during a single antenna scan. Each of the transponders 16 carried by aircraft is capable of detecting the transmission of the interrogation signal and in response thereto, the transponder automatically transmits a reply message. As shown in line (b) of FIG. 2, the reply message, as from aircraft A, is comprised of a first framing pulse, identified as A1, subsequently followed by a second framing pulse, identified as A2. The interval between the leading edge of the first framing pulse A1 and the leading edge of the second framing pulse A2 is precisely timed and in the case of the aforementioned Federal Aviation Agency System, is equal to 20.3 microseconds. As has been mentioned, the reply message transmitted by the transponder is utilized as an ordinary radar echo to determine range. Thus, the time interval between the transmission of the second pulse of the interrogation signal 20 and the reception at the ground station of the first framing pulse A1 is indicative of the range between the ground station and the aircraft A.

The reply interval of 20.3 microseconds between the leading edges of the framing pulses A1 and A2 is subdivided by equipment to be discussed hereinafter, into 14 time slots or bit periods. The first of these 14 time slots is dedicated to the first framing pulse, e.g., A1. The next thirteen time slots are used for the transmission of 13 data bits. During each of these time slots, the transponder can transmit a pulse to represent a binary "1". The non-occurrence of a pulse within a time slot represents a binary "0". Thus, as shown in line (b) of FIG. 2, the first data bit transmitted by the transponder of aircraft A during time slot $t_2$ is a "1". The next three succeeding data bits are all "0" and the following data bit is "1".

As will become clear hereinafter, timing means are initiated by the detection of the leading edge of the first framing pulse A1 to thereafter define successive time slots, each having a duration of 1.45 microseconds. Thus, after the detection of the leading edge of framing pulse A1, 14 successive time slots, each having a duration of 1.45 microseconds are defined prior to detection of the leading edge of framing pulse A2 occurring 20.3 microseconds after the detection of the leading edge of framing pulse A1.

Assuming the presence of aircraft B, as well as aircraft A in the vicinity of ground station 10, as shown in FIG. 1, the transponder 16B will also transmit a reply message in response to the interrogation signal 20 as shown in line (c) of FIG. 2. Note that the first framing pulse B1 of the reply message provided by transponder 16B arrives at the antenna subsequent to the framing pulse A1 because aircraft B is further from the ground station 10 than aircraft A. Note that the framing pulse B1 shown in line (c) of FIG. 2 overlaps with the first data pulse 22 shown in line (b) of FIG. 2. Inasmuch as the reply messages provided from both transponder 16A and 16B are essentially combined at the antenna to form what is generally referred to as SIF video, the interrogate/receive means 14 will see the SIF video signal illustrated in line (d) of FIG. 2. Note in line (d), that the pulse 24 has a duration determined by the time difference between the leading edge of the first data bit 22 of the aircraft A reply message and the trailing edge of the first framing pulse B1 of the aircraft B reply message.

In order to discriminate between the reply messages from aircrafts A and B contained within the SIF video signal of line (d) of FIG. 2, a self-variable width pulse discrimination technique is employed in accordance with the present invention. More particularly, as shown in line (e) of FIG. 2, a scan gate No. 1, to be discussed hereinafter in conjunction with FIG. 3, is enabled during each of the fourteen time slots following the detection of the leading edge of framing pulse A1 for a duration equal to the duration of the pulse A1. Thus, the scan gate 1 is enabled during the solid line pulse periods illustrated in line (e) of FIG. 2. On the other hand, a scan gate 2, also to be discussed in connection with FIG. 3, is enabled during substantially the remaining portion of each of the bit time slots. The gate enabling signals illustrated in line (e) of FIG. 2 are used to gate the SIF video shown in line (d) of FIG. 2. Lines (f) and (g) of FIG. 2 respectively illustrate the outputs of scan gate 1 and scan gate 2. Note that the output of scan gate 1 substantially corresponds to the reply message from aircraft A shown in line (b) except for the data bit 28 which improperly occurs during time slot $t_4$ as a consequence of the overlapping data bit provided in the reply message from transponder 16B shown in line (c) of FIG. 2. The occurrence of errors, as pulse 28, in line (f), is minimized (but of course not entirely eliminated) by the technique in accordance with the present invention of enabling the scan gate 1 for a duration determined by the duration of the first occurring framing pulse. The output of the scan gate 2 is shown in line (g) of FIG. 2 and it is seen to represent the reply message provided by transponder 16B shown in FIG. 1.

Attention is now called to FIG. 3 which illustrates a block diagram for facilitating the discrimination between reply message pulses occurring in near time coincidence on the common SIF video input line 40. The common communication line 40 is connected to a clocked threshold detect circuit 42. In order to suppress noise and other spurious effects, the threshold detect circuit 42 samples the line 40 at a very high rate with a bit decision being made upon the basis of three successive samples. More particularly, the output of the threshold detect circuit 42 is connected to the input of a three bit shift register 48. A gate 50 monitors the three stages of shift register 48 to develop an enhanced SIF video signal from the raw SIF video input available on channel 40. That is, the output of gate 50 will be true only if the raw video available on line 40 is true for three successive samples of the threshold detector 42. The enhanced SIF video signal provided by gate 50 can appropriately be considered the signal depicted in line (d) of FIG. 2. This signal is applied to the inputs of scan gates 1 and 2 which, as will be seen hereinafter, are enabled in accordance with the signal shown in line (e) of FIG. 2, to yield the scan gate output signals shown in lines (f) and (g) of FIG. 2.

Figure 4:
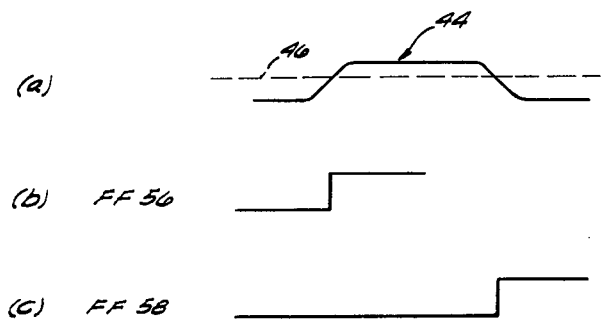
FIG. 4 is a waveform diagram illustrating the manner in which logic signals are developed to represent the leading and trailing edges of a pulse.

In order to measure the width or time duration of the first reply pulse received after an interrogation signal, flip-flops 56 and 58 are utilized to enable the first pulse to be recognized. Both of these flip-flops are reset at the beginning of a sweep interval in response to an interrogation signal. Flip-flop 56 is then set by the output of gate 60 indicative of the detection of the leading edge of a pulse on line 40. That is, the output of AND gate 60 goes true when the three stages of shift register 48 are all true which will occur within three sample periods after the signal 44, shown in line (a) of FIG. 4, exceeds the threshold 46. The detection of the leading pulse edge by AND gate 60 will switch the flip-flop 56 true. However, immediately prior to the flip-flop 56 being switched true by the output of gate 60, gate 62, responsive to the same set of input conditions as gate 60, and to the flip-flop 56 being false, will provide a true output signal to reset to zero a scale of 16 counter 64. Counter 64 is a free running counter responsive to clock pulses provided by clock pulse source 66. Clock pulse source 66 is a 10.32 megahertz source, thus enabling the counter 64 to define 16 counts (i.e., count zero to count $n$ where $n$ equals 15), or one full cycle, each 1.45 microseconds. Thus, inasmuch as counter 64 is a scale of 16 counter, each full cycle of counter 64 will define one of the bit time slots previously referred to.

From what has been said thus far, it should be appreciated that in response to the detection of the first leading pulse edge on line 40 after an interrogation signal, free running counter 64 will be reset to zero. The free running counter 68 is also a scale of 16 counter driven by the clock pulse source 66 and it is reset to zero upon recognition of the trailing edge of the first pulse appearing on line 40 after an interrogation signal. More particularly, it will be recalled that flip-flop 58 is reset in response to each interrogation signal. Flip-flop 58 is set by the output of AND gate 70 which responds to the bits 011 (from left to right as shown in FIG. 3) in the shift register 40. This bit configuration in the shift register 48 identifies the trailing edge of the pulse 44 shown in FIG. 4, line (a), as it passes in a negative going direction through the threshold 46. Thus, the trailing edge detector gate 70 will switch the flip-flop 58 true. However, gate 72 which is responsive to the same set of input conditions as gate 70, together with the flip-flop 58 being false and the flip-flop 56 being true, will provide a true output signal to reset the counter 68. Thus, it should now be clear that the counter 64 is reset to zero in response to the leading edge of the pulse 44 shown in FIG. 4 and the counter 68 is reset to zero in response to the trailing edge of the pulse 44. Accordingly, the difference in the counts of counter 64 and 68 will represent the width or time duration of the first pulse appearing on line 40 subsequent to an interrogation signal. It is presumed, of course, that this first pulse will constitute a framing pulse.

The counters 64 and 68 control flip-flops 76 and 78. Flip-flop 76 is set when counter 64 defines a zero count and reset when counter 68 defines a zero count. Thus, flip-flop 76 will be true for a duration equal to the duration or width of the first pulse occurring in each sweep interval after an interrogation signal. The true output of flip-flop 76 enables scan gate 1, as shown in line (e) of FIG. 2, for a duration during each bit-time slot equal to the duration of the first pulse occurring during the sweep interval. Flip-flop 78 enables scan gate 2 during the durations represented by the dotted line pulses in line (e) of FIG. 2. That is, flip-flop 78 is set in response to counter 68 defining a count of one and reset in response to counter 64 defining a count of 15. It will be noted from the block diagram of FIG. 3 and from line (e) of FIG. 2, that whereas scan gate 1 is disabled at count zero of counter 68, scan gate 2 is not enabled until count one of counter 68. Thus, for one clock pulse of clock pulse source 66, neither scan gate 1 nor scan gate 2 is enabled. Similarly, scan gate 2 is disabled at count fifteen of counter 64 and scan gate 1 is not enabled until count zero of counter 64. The offset between the enabled times of scan gates 1 and 2 introduces a tolerance into the system allowing for some slight variation in width from pulse to pulse even within the same sweep interval.

The output of scan gate 1 is fed into a shift register or delay line 80. The register 80 has a 15 bit capacity and is clocked by a 688 kHz clock pulse source 82. Inasmuch as the reply message format necessitates that the first and second framing bits be spaced by precisely 20.3 microseconds, the parallel output of the register 80 can be utilized to ascertain when the entire 15-bit reply message is contained within the register 80. That is, whenever the first and fifteenth stages of register 80 both store a "1," it necessarily means that the first and 15th bits are framing bits and that the 13 bits stored in the delay line 80 therebetween are data bits. The output taps of stages 1 and 15 of the register 80 are connected to the input of an AND gate 84 which will provide a true output signal when both of these stages stores a "1." When AND gate 84 provides a true output signal, it enables AND gates $86_1$ through $86_{15}$ to thus read out in parallel the 15 bits stored in the register 80 into a register 88 for subsequent processing by the processor 18 of FIG. 1.

From the foregoing, it should now be clear that the reply message transmitted by transponder 16A of FIG. 1 in response to the interrogation signal will be delivered into the register 88. The reply message from transponder 16B of FIG. 1 can also be extracted with some degree of confidence from the scan gate 2 of FIG. 3. Thus, the output of the scan gate 2 is connected to a register 90 in a manner identical to the output of scan gate 1. That is, the output of scan gate 2 feeds a register 90 controlled by the output of clock pulse source 82. The first and 15th stages of register 90 are monitored by AND gate 92 to recognize framing pulses spaced by 20.3 microseconds. When the framing pulses are recognized, the 15 bits in the register 90 are read out in parallel into a register 94.

From the foregoing, it will be recognized that a pulse quantizer system has been shown herein particularly suitable for use in a secondary radar system for discriminating between reply messages received on a common channel where the messages consist of the occurrence or non-occurrence of pulses within precisely defined time slots occurring after a first framing pulse. Improved discrimination is achieved in accordance with the present invention by employing a variable pulse width discrimination technique in order to reject pulse information falling outside of a portion of subsequent time slots determined during each sweep interval on the basis of the width of the first pulse transmitted by the transponder equipment active during that interval.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A system useful in combination with a communication channel which carries messages represented by the presence and absence of pulses, each occurring within a defined time slot, for discriminating between first and second messages overlapping in time, comprising:

first and second binary storage devices, (56, 58)
means (14) for periodically and concurrently producing reset signals, connected to reset said first and second binary storage devices;
first detecting means (60), connected to said communication channel to detect a pulse leading edge and to set said first binary storage device;
second detecting means (70), connected to said communication channel to detect a pulse trailing edge and to set said second binary storage device;
gating means (scan gates No. 1 and No. 2);
means (50) coupling said communication channel to the input of said gating means; and
enabling means, including duration measuring means (64, 66, 68) responsive to the states of said binary storage devices, connected to enable said gating means during each of said time slots for durations substantially equal to the duration of said first pulse measured by said duration measuring means.

2. The system described in claim 1 wherein said duration measuring means, enabling said gating means, comprises first and second free running cyclic counters (64, 68) each capable of defining counts from zero to n;

third detecting means (62), connected to said communication channel to detect a pulse leading edge and to said first binary storage device and connected to reset said first cyclic counter to a zero count when said first binary storage device is in its reset condition and said third detection means detects a pulse leading edge;
fourth detecting means (72) connected to said communication channel to detect a pulse trailing edge and to said first and second binary storage devices and connected to reset said second cyclic counter to a zero count when said first binary storage device is in its set state, said second binary storage device is in its reset state and said fourth detection means detects a pulse trailing edge; and
third and fourth binary storage devices (76, 78), connected to the outputs of said counters to set said third binary storage device on the zero count of said first counter, to reset said third binary storage device on the zero count of said second counter, to set said fourth binary storage device on a predetermined non-zero count of said second counter and to reset said fourth binary storage device on the n count of said second counter.

3. An adaptive pulse quantizer system useful in a secondary radar system for discriminating between reply messages received on a common channel, each reply message comprised of first and second framing bit pulses spaced in time by precise reply interval and by a plurality of data bit pulses, each able to occur during a corresponding bit time slot of a sequence of such time slots occurring during said reply interval, comprising:

first and second binary storage devices (56, 58);
means (14) for periodically and concurrently producing interrogation signals, connected to reset said first and secondary binary storage devices;
first detecting means (60), connected to said channel to detect a pulse leading edge and connected to set said first binary storage device when a pulse leading edge is detected;
second detecting means (70), connected to said channel to detect a pulse trailing edge and connected to set said second binary storage device when a pulse trailing edge is detected;
timing means (64, 66, 68) responsive to said initial reply pulse for thereafter defining said sequence of bit time slots;
a first gate (Scangate No. 1) having at least one input terminal;
means (50) coupling said common channel to one of said first gate input terminals; and
means (76) enabling said first gate during a corresponding portion of each of said time slots, in a first reply message, for a duration substantially equal to the duration of said initial reply message pulses.

4. An adaptive pulse quantizer system useful in a secondary radar system for discriminating between reply messages received on a common channel, each reply message comprised of first and second framing bit pulses spaced in time by precise reply interval by a plurality of data bit pulses, each able to occur during a corresponding bit time slot of a sequence of such time slots occurring during said reply interval, comprising:

first and second binary storage devices;
means for periodically producing interrogation signals, connected to reset said first and second binary storage devices;
first detecting means, connected to said channel to detect a pulse leading edge and connected to set said first binary storage device when a pulse leading edge is detected;
second detecting means, connected to said channel to detect a pulse trailing edge and connected to set said second binary storage device when a pulse trailing edge is detected;
timing means responsive to said initial reply pulse for thereafter defining said sequence of bit time slots;
a first gate having an input terminal;
means coupling said common channel to said first gate input terminal;
first and second free running cyclic counters each capable of defining counts from zero to n;
third detection means, connected to said communication channel to detect a pulse leading edge, said third detection means and said first binary storage device being connected to said first cyclic counter to reset said counter to a zero count when said first binary storage device is in its reset state and a pulse leading edge is detected; and fourth detection means, connected to said common channel to detect a pulse trailing edge, said second cyclic counter being connected to said fourth detection means and said first and second binary storage devices to reset said second cyclic counter to a zero count when said first binary storage device is in its set state, said second binary storage device is in its reset state and a pulse trailing edge is detected.

5. The system of claim 4 wherein said means enabling said first gate further includes means responsive to said first and second cyclic counters for enabling said first gate in response to said first counter defining a zero count and disabling said gate in response to said second counter defining a zero count.

6. The system of claim 5 including a second gate having an input terminal;
   means coupling said common channel to said second gate input terminal;
   means responsive to said second counter defining a count 1 for enabling said second gate, and to said first counter defining a count 2 for disabling said second gate.

* * * * *